United States Patent
Lindskog et al.

(10) Patent No.: US 7,433,702 B2
(45) Date of Patent: Oct. 7, 2008

(54) POWER STATUS FOR WIRELESS COMMUNICATIONS

(75) Inventors: Jan Lindskog, Pixbo (SE); Fredrik Sällström, Göteborg (SE); Lorens Almehag, Enskede (SE); Göran Malmgren, Huddinge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1452 days.

(21) Appl. No.: 09/757,084

(22) Filed: Jan. 10, 2001

(65) Prior Publication Data

US 2001/0031626 A1   Oct. 18, 2001

Related U.S. Application Data

(60) Provisional application No. 60/178,771, filed on Jan. 28, 2000.

(51) Int. Cl.
 H04B 7/00    (2006.01)
(52) U.S. Cl. ............... 455/522; 455/245.1; 455/67.13
(58) Field of Classification Search .............. 455/466, 455/41.2, 41.3, 63.1–67.7, 574, 573, 572, 455/343.1–343.6, 418, 423, 425, 426.1, 426.2, 455/452.2, 522, 561, 114.2, 226.1, 226.2, 455/226.3, 235.1, 245.1, 501
See application file for complete search history.

(56) References Cited

U.S. PATENT DOCUMENTS

| | | | |
|---|---|---|---|
| 5,560,021 A | | 9/1996 | Vook et al. |
| 5,657,317 A | * | 8/1997 | Mahany et al. ............. 370/338 |
| 5,682,379 A | * | 10/1997 | Mahany et al. ............. 370/311 |
| 6,085,114 A | * | 7/2000 | Gibbons et al. ............. 455/574 |
| 6,192,230 B1 | * | 2/2001 | van Bokhorst et al. ... 455/343.3 |
| 6,331,971 B1 | * | 12/2001 | Raith ............. 370/311 |
| 2001/0053710 A1 | * | 12/2001 | Gibbons et al. ............. 455/574 |
| 2004/0002366 A1 | * | 1/2004 | Cromer et al. ............. 455/574 |

FOREIGN PATENT DOCUMENTS

EP    2 328 766 A    3/1999

OTHER PUBLICATIONS

Patent Abstracts of Japan, abstract of JP 11-127165 A (Kokusai Electric Co. Ltd.), May 11, 1999.
International Search Report mailed Jul. 9, 2001 in corresponding PCT application No. PCT/SE01/00161.

* cited by examiner

*Primary Examiner*—Edward Urban
*Assistant Examiner*—Raymond S. Dean
(74) *Attorney, Agent, or Firm*—Nixon & Vanderhye, P.C.

(57) ABSTRACT

A wireless local area network (LAN) is operated so that a mobile terminal (MT) transmits various power-related information over an air interface to a power status repository (PSR) of the wireless local area network (LAN). For example, in one aspect of the invention, the mobile terminal transmits power status information, the power status information having an indication of whether the mobile terminal is currently operating using battery power or line power. The power status information is transmitted at one of the following times: (1) upon power-up of the mobile terminal; (2) upon command issued from the power status repository; (3) upon establishment of a connection between the mobile terminal and the LAN; and (4) upon a change in power status for the mobile terminal. The power status repository (PSR) can take the form of an Access Point (AP) for an intranet, or another mobile terminal in the case of an ad hoc network. In differing embodiments, the power status information can either be transmitted as a dedicated message or in a message with other status information. In another aspect, the mobile terminal which transmits to the power status repository certain measurement capability information. The measurement capability information has an indication of whether the mobile terminal has a capacity to perform radio frequency measurements. For example, the measurement capability information can indicate one of low power of the mobile terminal or a power restriction on the mobile terminal. As another example, the measurement capability information can indicate a particular sleep mode of the mobile terminal. In accordance with yet another aspect of the invention, if the power status repository does not have sufficient measurements regarding radio frequency (in view, e.g., of power incapacitation by one or more mobile terminals (MTs) in its cell), the power status repository can modify (e.g., increase) a rate at which a frequency measurement command is transmitted to other mobile terminal(s) in the cell. In still another aspect of the invention, the mobile terminal determines a duration of a sleep cycle in accordance with the power status information of the mobile terminal.

12 Claims, 7 Drawing Sheets

POWER STATUS FOR WIRELESS COMMUNICATIONS

This application claims the priority and benefit of U.S. provisional patent application Ser. No. 60/178,771, filed Jan. 28, 2000, which is incorporated herein by reference in its entirety.

BACKGROUND

1. Field of the Invention

The present invention pertains to wireless communications, and particularly aspects of wireless communications including power saving operations and frequency selection/change.

2. Related Art and Other Considerations

Power conservation has long been a concern for computers, particularly computers which utilize a battery power source to some degree. Power conservation is an important factor for computers which are connected in wireless manner to a local area network (LAN), including portable or mobile computers or other telecommunications units including the same.

A computer such as a personal computer (PC) typically has various devices which communicate over one or more buses with each other. Often some of these devices can have a power save feature. For a PC which executes an operating system of the Microsoft® Windows® family and forms part of a LAN, the power save feature for these devices has become known as "Wake-On-Lan". Wake-On-Lan is used to achieve low power consumption, but still permits connectivity for incoming information from the LAN to the PC.

The Microsoft® Wake-On-Lan power saving implementation has power modes both for the devices connected to the PC bus, as well as "system" power modes. In view of the fact that wireless LANs are employed, e.g., to facilitate mobility of the computer or workstation, the "system" in the context of a wireless LAN can be referred to as a "mobile terminal" (MT) or "user equipment" unit (UE). The mobile terminal (MT) includes a device (e.g., a card or circuit board) which is utilized to interface to the wireless network, such card often being referred to as a wireless Network Interface Card (NIC). Thus, the terminology "mobile terminal (MT)" encompasses both the Network Interface Card (NIC) and the computer which accommodates the Network Interface Card (NIC).

In the Microsoft® Wake-On-Lan scheme, a device can have power modes D0, D1, D2, and D3, ranging from mode D0 (which has no power saving at all) to mode D3 (the deepest power save mode). The device modes are denoted herein as Dx, where x is one of 0, 1, 2, or 3. The system has power modes S0, S1, S2, S3, S4, and S5. In mode S0, the power for the system is fully on, whereas mode S4 is a hibernate mode (a very deep sleep mode but in which the system is able to resume operation with a reboot). The S5 mode means that the system is off and that a reboot is the only way to resume system operation. Using similar notation as with the device modes, the system generally modes are denoted as Sx.

With the Wake-On-Lan functionality, an interrogation is performed between the devices connected to a common bus prior to entering a lower power mode, e.g., modes D1, D2, or D3. The least capable mode (i.e., highest power mode) for any of the devices on the bus is selected as the preferred mode for the bus. There are specific requirements for each of the device power saving modes, including power consumption requirements. The higher the number of the mode, the lower is the power consumption.

Wake-On-Lan can work from any Dx mode as long as the system mode is less than S5 and the device is able to follow the preconditions and requirements for that Dx mode (e.g., power consumption requirement), and still be able to detect received frames. When a device detects a wake-up event, the device signals the system accordingly. This signaling is accomplished in different ways depending on which bus the device is placed on. For example, on a CardBus the signaling is accomplished using a line CSTSCHG#.

Two types of standards for wireless LANs are briefly described below. The first type of standard is the HIPERLAN (HIgh PErformance Radio Local Area Network) standard; the second type of standard is the IEEE 802.11. HIPERLAN (HIgh PErformance Radio Local Area Network) is an ETSI (European Telecommunications Standards Institute) standard for wireless LANs, there being existing standards for HIPERLAN Type 1 and proposed standards for HIPERLAN Type 2 (H2). IEEE 802.11 is an IEEE (Institute of Electrical and Electronics Engineers) standard for Wireless LANs.

Concerning first the HIPERLAN standards, H2 is based on a time-division multiple access/time-division duplex protocol. In H2, an in-building component operates at 5 GHz and the second generation of the standard operates at at least 24 Mbits/s sustained, with potentially even higher data rates.

In H2, the mobile terminal (MT) communicates with an Access Point (AP). The LAN may have several Access Points (AP), each of which is essentially analogous to a base station serving a cell. Since H2 is time division duplex (TDD), both the mobile terminal (MT) and the Access Point (AP) use the same frequency. The Access Point (AP) is connected to an operator's intranet. The intranet can be, for example, for a company or industrial complex, office, hospital, airport, or even home or private use). The Access Point (AP) of the cell selects, preferably with respect to its cell autonomously, the best frequency for communicating with a particular mobile terminal (MT). In the best frequency selection, the Access Point (AP) utilizes measurements taken both by the Access Point (AP) itself, as well as measurements taken by the mobile terminal (MT) and forwarded to the Access Point (AP). In this regard, the measurements can be, for example, interference measurements (e.g., signal to noise ratios [SNRs]) for various eligible frequencies for selecting a best available frequency.

A Medium Access Control (MAC) layer is utilized for controlling communications between the Access Point (AP) and an mobile terminal (MT). In particular, the Medium Access Control (MAC) layer for the wireless LAN is a reservation-based MAC layer.

Assuming that a particular mobile terminal (MT) has been authenticated and a connection has been established, various transactions typically occur. Discussion of these transactions is facilitated by an understanding of the MAC frame structure shown in FIG. 11. The frame is typically 2 ms, and a Broadcast Control Channel (BCCH) is always sent in every frame. The BCCH includes a pointer to the beginning of a random access channel (RCH) start, and the number of random access channels included in the frame. The RCH itself is a transport channel of nine byte size that can contain various logical information protocol data units. In addition to RCH, other transport channels such as Broadcast Channel (BCH), FCH, ACH, SCH, LCH, and RCH are utilized, all of which are filled with logical channels. If it were assumed that there is only one sector per cell, then there would be one BCH, one FCH, and one ACH per frame. However, there can be multiple SCH, LCH, and RCH per frame. ACH is a feedback channel that conveys the Access Point (AP) reception status of the RCHs. LCH is used to signal user data and control data. SCH is used for feedback signaling of the user data reception status (ARQ) and also for controlling signaling. RCH can be filled with resource requests, connection setup messages, and control messages. The Access Point (AP) has a scheduling entity which is responsible for filling the frames with the random access channel opportunities, e.g., RCHs.

Concerning the transactions mentioned above, in order to send Uplink (UL) data the mobile terminal (MT) has to monitor a Downlink (DL) Broadcast Control Channel (BCCH), which is transmitted in the Broadcast Channel (BCH). This monitoring of the Downlink (DL) Broadcast Control Channel (BCCH) is for the purpose of ascertaining where the random access channel (RCH) opportunities are located in the frame. The random access channel (RCH) is utilized by the mobile terminal (MT) in order to request UL resources. The random access request is acknowledged by the Access Point (AP), and the Access Point (AP) starts scheduling the UL resources for the mobile terminal (MT) in a time division duplex (TDD) airlink traffic channel, i.e., the reservation based on the requested access begins.

Upon reception of the Downlink (DL) at the Access Point (AP) of data from the fixed network (e.g., the operator's intranet) which is destined to the mobile terminal (MT), the Access Point (AP) can either (1) buffer such data if the mobile terminal (MT) is sleeping (e.g., defer the transmission of such data until after the Access Point (AP) has waken the mobile terminal (MT)); or (2) transmit the data at the next possible occasion. Data is announced by the Access Point (AP) to the mobile terminal (MT) by broadcasting a MAC-ID of the mobile terminal (MT) in the Frame Control Channel (FCCH) that is transmitted in the Frame Channel (FCH) sent after the BCH [see FIG. 11]. The FCCH also contains the exact location where the data is carried in the DL phase.

HIPERLAN Type-2 facilitates battery lifetime conservation using a sleep mode at the mobile terminal (MT), known herein as the H2 sleep mode. In order to enter the H2 sleep mode, the mobile terminal (MT) has to petition the Access Point (AP) explicitly for permission to sleep. When in H2 sleep mode, a mobile terminal (MT) will monitor BCCH only periodically. The periodicity for such monitoring of the BCCH is negotiated between the mobile terminal (MT) and the Access Point (AP).

Currently it is envisioned that H2 shall involve no manual frequency planning, but that the frequency used by each Access Point (AP) is selected by a Dynamic Frequency Selection (DFS) algorithm. The Dynamic Frequency Selection (DFS) algorithm is implemented in the H2 radio access network itself, e.g., at the Access Point (AP), on the basis of received signal strength (RSS) measurements. As mentioned above, the Access Point (AP) utilizes both measurements performed by the Access Point (AP) itself as well as measurements taken by the mobile terminal (MT) in the cell managed by the Access Point (AP). In this regard, upon command from the Access Point (AP), the mobile terminal (MT) can measure both the RSS of the frequency currently being utilized for communication with the Access Point (AP), as well as other frequencies. The particular frequencies which the mobile terminal (MT) is to measure, and in what frame, is assigned by control signaling from the Access Point (AP).

Thus, the performance of the Dynamic Frequency Selection (DFS) algorithm depends upon measurements from the mobile terminal (MT). In HIPERLAN Type 2 as currently envisioned, the Access Point (AP) knows basically whether the mobile terminal (MT) is in an H2 sleep mode or not, but knows very little else about the mobile terminal (MT) power status.

Various problems can arise in H2 operations depending on the periodicity of the measurements required from the mobile terminals (MTs), as is illustrated in two distinct cases described below. A first such case focuses on a problem for the mobile terminal (MT). As is readily understood, it is highly desirable for the mobile terminal (MT) to minimize power consumption during either an active mode or a sleep mode. In the sleep mode, the active/inactive duty cycle is very low, in the range of 1/1000 for sleep duration of ten frames. The duty cycle depends on the periodicity by which the mobile terminal (MT) monitors the BCCH. Depending on the measurement requirement dictated by the Access Point (AP), the signal strength measurements on adjacent frequencies very easily will add up to the magnitude of 1/1000. In other words, if constant measurements of adjacent frequencies are required in the sleep mode, battery consumption will become a problem. Or, since battery consumption is a non-negotiable parameter, the measurements must be infrequent to avoid high battery consumption, but on the other hand, the greater risk is to loose any vital information.

Power consumption must, of course, include both the power consumption in the Network Interface Card (NIC) and also the power consumption in the PC. It is likely, but not necessarily the case, that the PC in sleep mode state D0 consumes much greater power than the Network Interface Card (NIC) in sleep mode state D0. If, then, measurement is required by the Access Point (AP), for a Network Interface Card (NIC) in sleep mode D3, requires a wake up of the PC in order to increase the power state from D3 to D0 (or other), then it is likely that the power consumption in the PC is the critical aspect. Depending on the system state Sx (x=0–5), after the wake up the increase in power consumption can be reduced, e.g., it would be unnecessary to turn on the monitor device, for example. This again leads to the same problem of decreased battery lifetime for the mobile terminal (MT).

The second case involves the Access Point (AP). PC power management will sometimes force the mobile terminal (MT) to enter a lower power mode, e.g., D1, D2, or D3. There are requirements (e.g., power consumption requirements) to enter these different states, the lower the state Dx (x=1–3), the higher is the requirement upon low power consumption. Depending upon the power consumption for each vendor device, there it may be more or less problematic to support the measurement within a low power mode.

As an aside, it is mentioned in passing that the foregoing may lead to a workaround described above to wake up the PC. In this case, however, the assumption is that the Network Interface Card (NIC) defers to do the measurement.

From the point of view of the Dynamic Frequency Selection (DFS) algorithm of an Access Point (AP), the condition is negative since the device may then not be able to perform the measurement, and the Access Point (AP) will not be aware of it other than the fact that measurement reports will not be received. If multiple mobile terminals (MTs) in a cell are unavailable to measure upon request from the Access Point (AP), then the lack of measurement samples may lead to a performance degradation in the cell. For the mobile terminal (MT), the problem will occur that even though the measurement request has been properly received, no action can be taken since it would drain the battery availability and lead to a synchronization loss or similar fatal error.

Decoupled from the Dynamic Frequency Selection (DFS) measurement problem, but tightly coupled to the battery problem, is that the requested sleep periodicity affects the power consumption for the mobile terminal (MT). Shorter sleep cycles increase power consumption but shorten the response time upon mobile terminated transactions.

IEEE 802.11, the second type of standard mentioned above, is based on a carrier sense multiple access collision avoidance (CSMA/CA) medium sharing mechanism. The medium access control (MAC) supports operation under control of an access point as well as between independent mobile terminals. The second generation of the standard operates at 5 GHz and provides bitrates up to 54 Mbps.

The CSMA/CA procedure requires each device (MT and AP) with pending data to transmit to sense the medium to determine if another device is transmitting. If the medium is not determined to be busy, the transmission may proceed. A transmitting device shall ensure that the medium is idle for a predefined duration before attempting to transmit. If the medium is determined to be busy, the device shall defer until the end of the current transmission. After deferring, or prior to attempting to transmit again after a successful transmission, the device shall select a random backoff interval and shall decrement the backoff interval counter while the medium is idle. The receiver that successfully receives and decodes a protocol data unit acknowledges the reception by transmitting an acknowledgement protocol data data unit back to the sender. Both acknowledged and unacknowledged data transmissions are supported, and specific fields in the data unit header determine the type of transmission.

IEEE 802.11 can be set up both as an infrastructure Basic Service Set (BSS), where an AP via the wireless media provides access for one or multiple MT's, e.g. in an office scenario the AP provides access to the wired LAN for the MT's.

IEEE 802.11 can also be set up as an independent BSS, where MTs via the wireless media can set up a communication network in between the MTs. The term "ad hoc" is often used as slang to refer to an independent BSS. An ad hoc network is typically created in a spontaneous manner, e.g. the MT's in a conference room may create an ad hoc network for the duration of a meeting.

IEEE 802.11 facilitates battery lifetime conservation using a sleep mode at the mobile terminal (MT), known herein as the IEEE sleep mode. For an ad-hoc network an MT requesting to enter a low power mode indicates the low power request by setting a 'Power Management field' in the frame control field of a MAC protocol data unit frame. The value indicates the mode in which the MT will be after the successful completion of the frame exchange. The receiver of the frame exchange with the 'Power Management field' set to sleep can be any other MT in the ad-hoc network.

An MT that successfully completes a frame exchange with the 'Power Management field' set to "sleep" can enter a low power mode until next start of a target beacon transmit time (TBTT). In an ad-hoc network at least one MT transmits periodically a beacon with system parameters. The beacon is transmitted once per beacon interval, with a tentative transmission start at the TBTT. 'Tentative' is due to the fact that each MT must sense the activity on the wireless media prior to any transmission. For occasions when another MT transmits at the expiration of TBTT, the beacon transmission must await the transmission. From the TBTT start occasion until a predefined certain period, all sleeping MT will monitor any 'wake-up' message destined to the MT. At the absence of a wake-up message the MT can enter a low power mode until next TBTT. If a wake-up message is received an MT must respond to the message and revert to active mode.

For MTs under an infrastructure AP, similar (but not exactly the same) procedures exist. The particular differences are that the MT must inform the AP prior to entering low power mode. The AP then transmits a list of all MTs that have pending data at the AP denoted Traffic Indication Map (TIM). TIM is transmitted in the beacon. Since MT's may sleep for longer period than a beacon interval, the AP must indicate the presence of pending data to a MT in multiple beacon transmissions.

Currently no dynamic frequency selection (DFS) exists in IEEE 802.11, but efforts appear underway to include DFS in the IEEE 802.11 standard. Since DFS relies on measurement results, the similar problems as described for H2 above will, upon such inclusion, exist for IEEE 802.11 as well.

In Wireless LAN system of today, mostly Laptop PCs are utilized. When these units are in operation, e.g. word editing, these units drain a substantial amount of power and thus require batteries that can provide an acceptable battery lifetime. With the introduction of Palmtop devices in wireless LAN systems, the power consumption will be much more critical. To a certain extent each manufacturer may utilize techniques that will lower the power consumption. But it is likely that the wireless LAN standards will have to provide means to enable lower power consumption for a subset of the devices. Currently, neither IEEE 802.11 nor H2 has a mechanism to identify which units are units with low power requirement.

BRIEF SUMMARY

A wireless local area network (LAN) is operated so that a mobile terminal (MT) transmits various power-related information over an air interface to an power status repository of the wireless local area network (LAN). The power status repository (PSR) can take the form of an Access Point (AP) when connecting to a fixed wired network (e.g. intranet), or another mobile terminal in the case of an ad hoc network.

In one example aspect of the invention, the mobile terminal transmits power status information, the power status information having an indication of whether the mobile terminal is currently operating using battery power or line power. The power status information is transmitted at one of the following times: (1) upon power-up of the mobile terminal; (2) upon command issued from the power status repository; (3) upon establishment of a connection between the mobile terminal and the LAN; and (4) upon a change in power status for the mobile terminal. In differing embodiments, the power status information can either be transmitted as a dedicated message or in a message with other status information.

In another aspect, the mobile terminal transmits to the power status repository certain measurement capability information. The measurement capability information has an indication of whether the mobile terminal has a capacity to perform radio frequency measurements. For example, the measurement capability information can indicates one of low power of the mobile terminal or a power restriction on the mobile terminal. As another example, the measurement capability information can indicate a particular sleep mode of the mobile terminal.

In accordance with yet another aspect of the invention, if the power status repository does not have sufficient measurements regarding radio frequency (in view, e.g., of power incapacitation by one or more mobile terminals (MTs) in its cell), the power status repository can modify (e.g., increase) a rate at which a frequency measurement command is transmitted to other mobile terminal(s) in the cell.

In still another aspect of the invention, the mobile terminal determines a duration of a sleep cycle in accordance with the power status information of the mobile terminal.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

The present invention basically involves communication of power status information from a mobile terminal (MT) operating in a wireless local area network to a power status repository (PSR) of the network. The wireless local area network can be of any type, including a type of wireless local area network typified by use of Access Points (AP) in the manner generally illustrated in FIG. 1A, or an "ad hoc" type of wireless local area network (such as that facilitated by IEEE 802.11) having an independent Basic Service Set in which mobile terminals generally communicate among themselves (as generally illustrated in FIG. 1B).

Figure 1A:
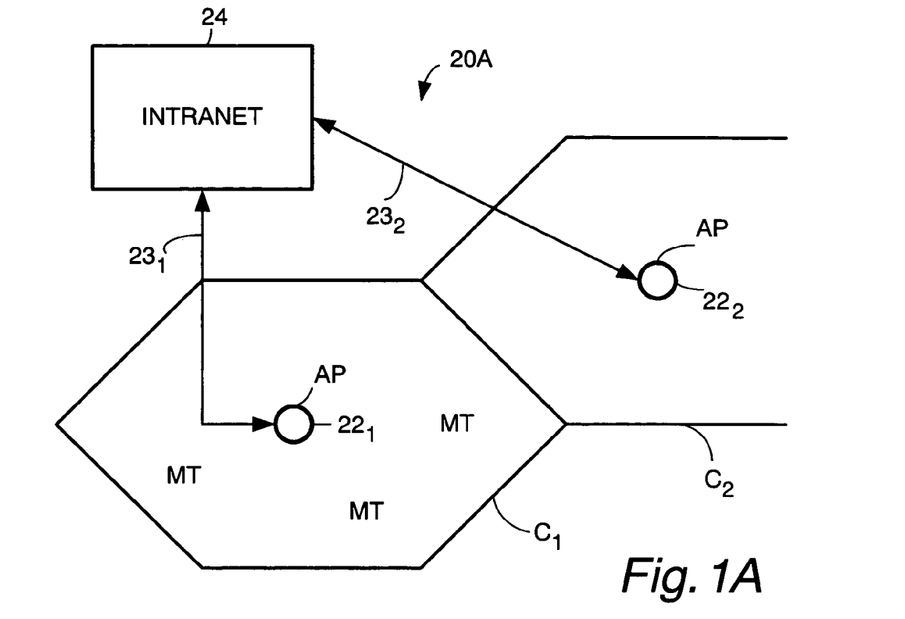
FIG. 1A is a diagrammatic view of portions of a first type of wireless LAN according to an embodiment of the invention.

FIG. 1A shows portions of an example of the first type of wireless local area network (LAN) 20A, including two Access Points (APs) $22_1$ and $22_2$. The Access Points (APs) $22_1$ and $22_2$ are connected, e.g., by respective cables $23_1$ and $23_2$, to an intranet 24. Each Access Point (AP) 22 serves a cell C, e.g., Access Point (AP) $22_1$ serves cell $C_1$. In this first type of network, one or more of the Access Points can serve as the Power Status Repository(ies) (PSR) as hereinafter described. At any given moment, plural mobile terminals (MTs) can reside in a cell C. At the moment in time illustrated in FIG. 1A, it just so happens that three mobile terminals (MTs) are located in cell $C_1$. It should be understood, of course, that mobile terminals (MTs) can roam from one cell to another, or that handoff of a mobile terminal from one cell to another is possible when a mobile terminal (MT) is engaged in a connection.

Figure 1B:
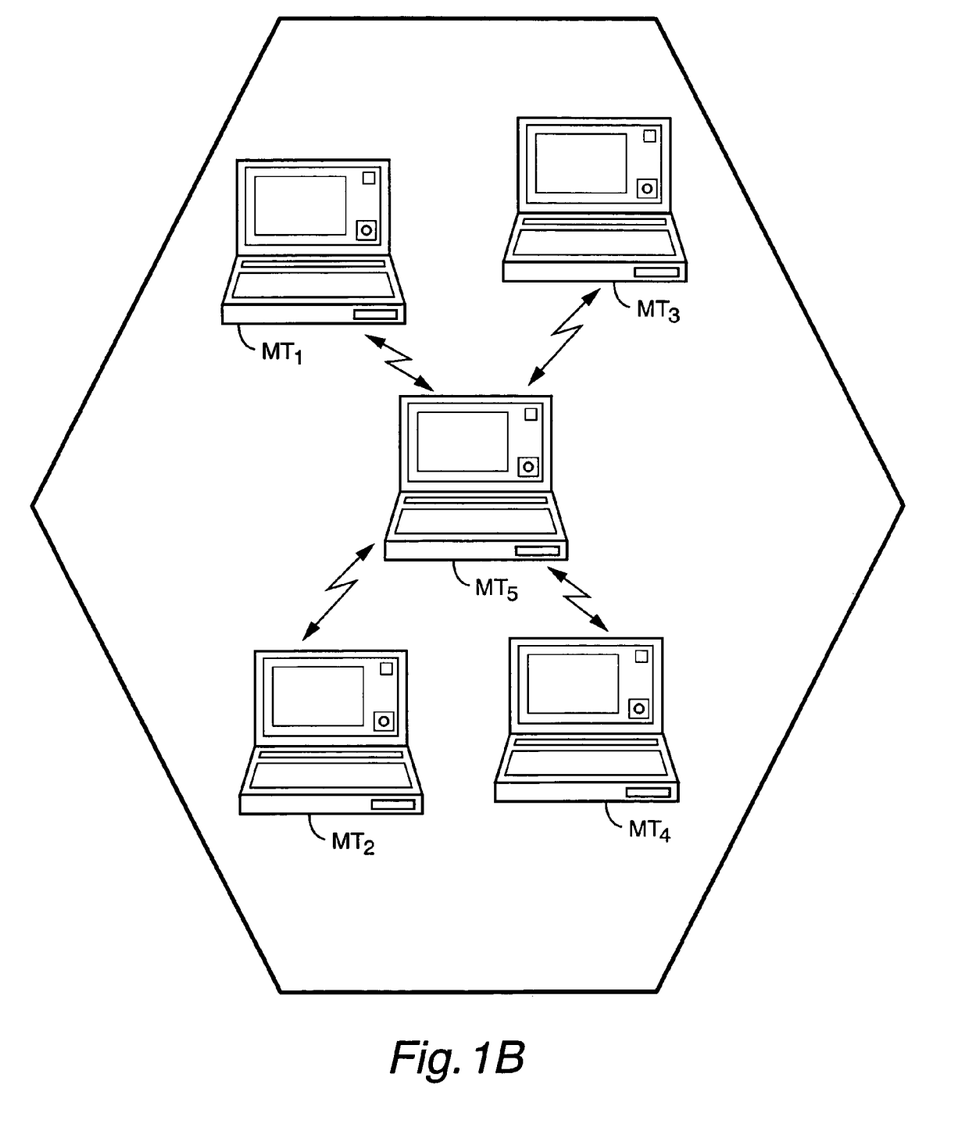
FIG. 1B is a diagrammatic view of portions of a second type of wireless LAN according to an embodiment of the invention.

FIG. 1B shows portions of an example of the second type of wireless local area network (LAN) 20, e.g., wherein plural mobile terminals form an ad hoc network. For sake of convenience, FIG. 1B illustrates seven such mobile terminals ($MT_1$ through $MT_7$) being involved in the ad hoc network. In the illustrated example, mobile terminal $MT_4$ serves as the Power Status Repository (PSR). It should be understood that another or plural ones of the mobile terminals could instead serve as the Power Status Repository (PSR).

Figure 2:
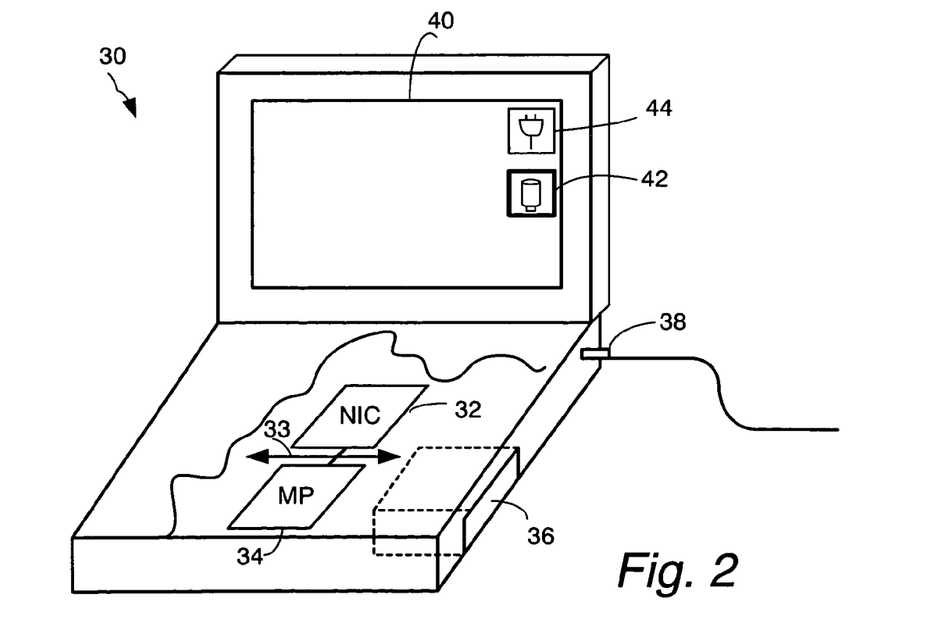
FIG. 2 is a perspective view of a mobile terminal (MT) in accordance with an embodiment of the invention.

FIG. 2 illustrates an example mobile terminal (MT) 30 useful with any type of wireless local area network, e.g., the network type of FIG. 1A or the network type of FIG. 1B. The example mobile terminal (MT) 30 is, in one embodiment, a laptop with mobile termination. The mobile terminal (MT) 30 includes a Network Interface Card (NIC) 32, which is connected by a bus 33 to other devices, including a microprocessor 34. The microprocessor 34 executes an operating system, as well as various application programs. The mobile terminal (MT) 30 can be powered by one or more batteries, such as battery 36, or by line power (shown as being supplied via cable and plug 38). The mobile terminal (MT) 30 has a display screen 40 which provides, e.g., status information regarding various aspects of the mobile terminal (MT).

In accordance with the present invention, mobile terminal (MT) 30 sends power status information to the Power Status Repository (PSR) with which the mobile terminal (MT) 30 is communicating. As indicated above, the Power Status Repository (PSR) can be an Access Point (AP) 22 in the case of the network type of FIG. 1A, or another mobile terminal in the case of an ad hoc network type as in FIG. 1B. The power status information advises the Power Status Repository (PSR) whether the mobile terminal (MT) 30 is currently using its battery for power, or alternatively is using line power. The line current can be AC current applied to the mobile terminal (MT) 30 and converted internally to a DC voltage, or externally converted from AC to DC by an adapter or the like.

Conventional laptops already ascertain this power status information, and provide a comparable indication of power status on screen 40. For example, screen 40 has an icon 42 associated with battery power supply and an icon 44 associated with line current power supply. Whichever power supply is currently in use is indicated on screen 40 by its associated icon having a contrasting appearance. For example, in FIG. 2 the battery power supply icon 42 is active to indicate that mobile terminal (MT) 30 is operating upon battery 36.

In one of its aspects, the present invention capitalizes upon this existing power status information by having the Network Interface Card (NIC) transmit the power status information (hereinafter, "power status") to the Power Status Repository (PSR) 22. The mobile terminal (MT) 30 can send the power status to Power Status Repository (PSR) 22 at specified times, e.g., upon power-up of mobile terminal (MT) 30; upon command (e.g., from the Power Status Repository (PSR)); upon LAN connection establishment; or, upon changes in power status, e.g., line power removed by the user.

Figure 3:
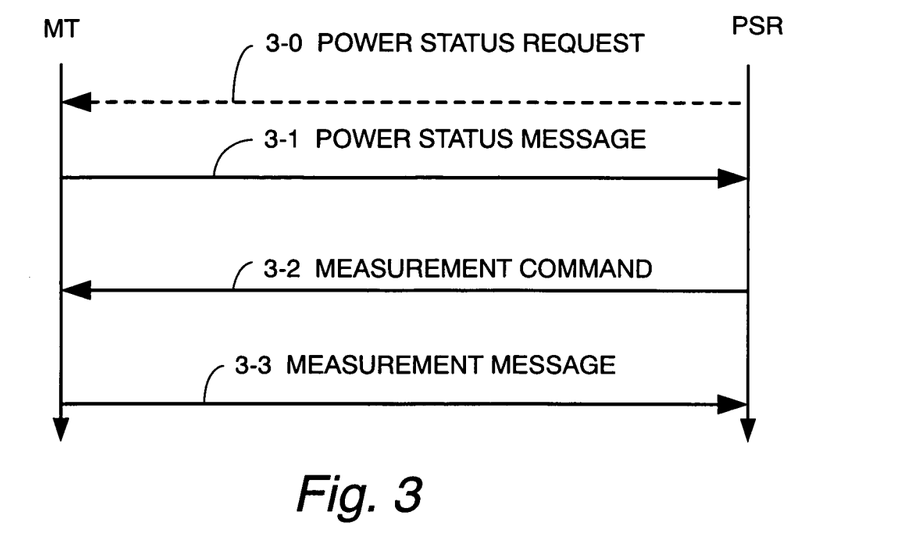
FIG. 3 is a schematic view depicting certain messages transmitted between a mobile terminal (MT) and a Power Status Repository (PSR) in accordance with the present invention.

FIG. 3 shows mobile terminal (MT) 30 sending an example power status information to Power Status Repository (PSR) 22 over air interface AI using a power status message 3-1. The power status message 3-1 can use any appropriate signaling between the Power Status Repository (PSR) and the mobile terminal (MT), such as a MAC specific signal, proprietary signaling, or in a message embedded with other parameters (see, e.g., FIG. 8B).

Figure 8A:
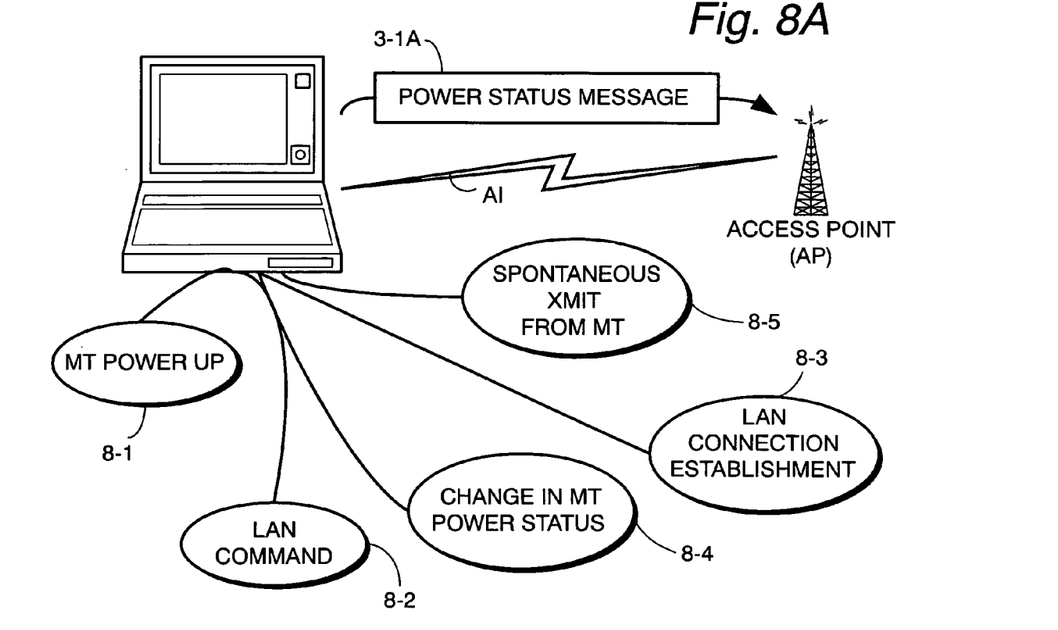
FIG. 8A is a diagrammatic view showing transmission of power status information from a mobile terminal to a Power Status Repository (PSR) in a separate (dedicated) message.

FIG. 8A shows the power status information being transmitted over air interface AI from the mobile terminal (MT) to the Power Status Repository (PSR) in a separate or dedicated power status message 3-1A. While the Power Status Repository (PSR) of FIG. 8A is represented as being an Access Point (AP), it should be understood that the Power Status Repository (PSR) of FIG. 8 (and FIG. 8A subsequently described) could instead be another mobile terminal in the case of an ad hoc local area network. Further, FIG. 8A shows various events/situations in which the power status information can be sent from the mobile terminal (MT) 30 to Power Status Repository (PSR) 22. Example of such situations, illustrated in FIG. 8A, include situation 8-1 [upon power-up of mobile terminal (MT) 30]; situation 8-2 [upon command (e.g., from the Power Status Repository (PSR))]; situation 8-3 [upon LAN connection establishment]; situation 8-4 [upon changes in power status, e.g., line power removed by the user]; or situation 8-5 [spontaneous transmission from mobile terminal (MT)].

With respect to situation 8-2, FIG. 3 shows Power Status Repository (PSR) 22 issuing a command 3-0 which serves to request power status, and which happens to precede and prompt the power status message 3-1. Such command 3-0, herein referenced as a power status request, is shown in broken lines, since not all power status messages are preceded by such a command (the power up situation being one such example). Moreover, it should be understood that the command 3-0 need not be dedicated to a power status elicitation, and that the command 3-0 may take the form of other signaling which the mobile terminal (MT) interprets also as a power status request.

Regarding situation 8-5, it should be understood that the power status information can be sent at the initiative of the mobile terminal (MT) in accordance with spontaneous or predetermined criteria, e.g., when connection is set up or when status is changed.

Figure 8B:
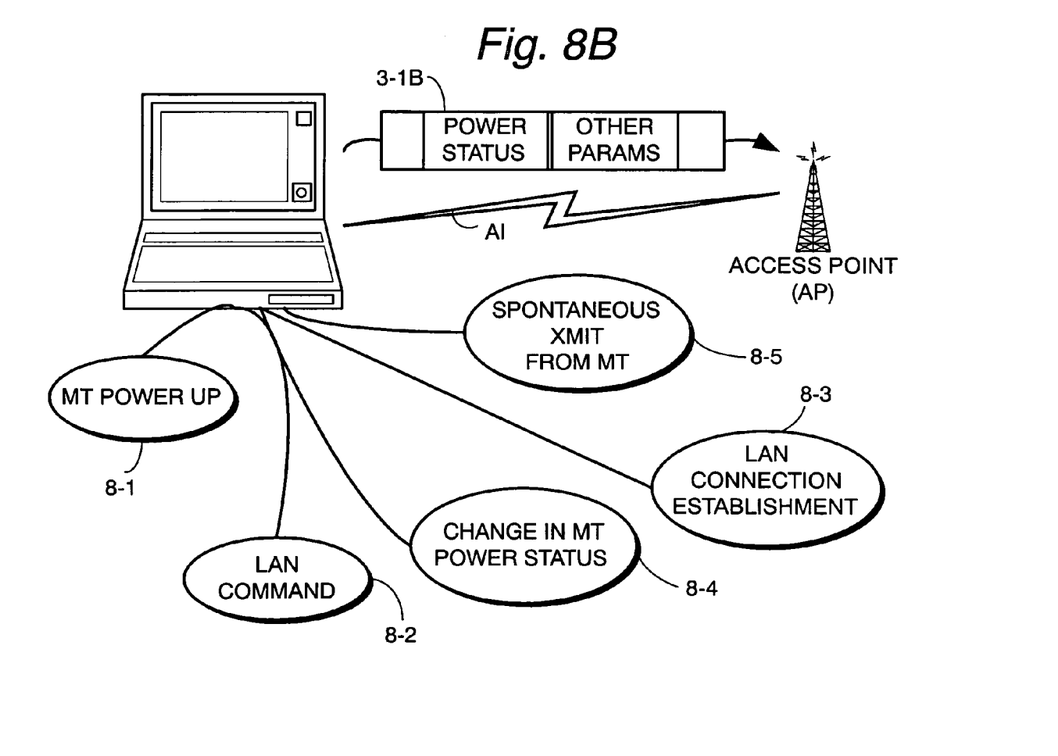
FIG. 8B is a diagrammatic view showing transmission of power status information from a mobile terminal to a Power Status Repository (PSR) in a non-dedicated message.

Whereas FIG. 8A shows the power status information being included in a separate message, FIG. 8B shows a situation in which the power status information is included in another message 3-1B which is not dedicated only to power status information (e.g., a general status message). For example, as depicted in the scenario of FIG. 8B the power status information can be transmitted in the same message with other status information (such as, for example, the number of supported connections or the maximum number of repetitions, etc.). After association with the Power Status Repository (PSR), connections are set up and link capabilities are exchanged. One alternative is that the message be sent in the link capability exchange, which includes a number of parameters. The situations of FIG. 8A are equally applicable to FIG. 8B as well.

As explained below in connection, e.g., with FIG. 4, in another of its aspects the Power Status Repository (PSR) 22 of the present invention uses the information provided in the power status message 3-1 (especially information indicating whether the mobile terminal (MT) 30 is currently being powered by battery power or line power) in executing a measurement routine. The measurement routine determines how often the mobile terminal (MT) 30 is to conduct measurements of received signal strength on the various frequencies for which the Power Status Repository (PSR) commands measurements. As explained previously, the purpose of such measurements is to facilitate selection by the Dynamic Frequency Selection (DFS) algorithm of a best frequency for use between the Access Point (AP) and the mobile terminal (MT) in the case of a FIG. 1A type of network, and between the mobile terminal (MT) and other mobile terminals in the case of a FIG. 1B ad hoc type of network. FIG. 3 further illustrates the Power Status Repository (PSR) sending a measurement command 3-2 to mobile terminal (MT) 30 in accordance with performance of its measurement routine. Pursuant to the measurement command 3-2, the mobile terminal (MT) 30 returns a measurement message 3-3.

Figure 4:
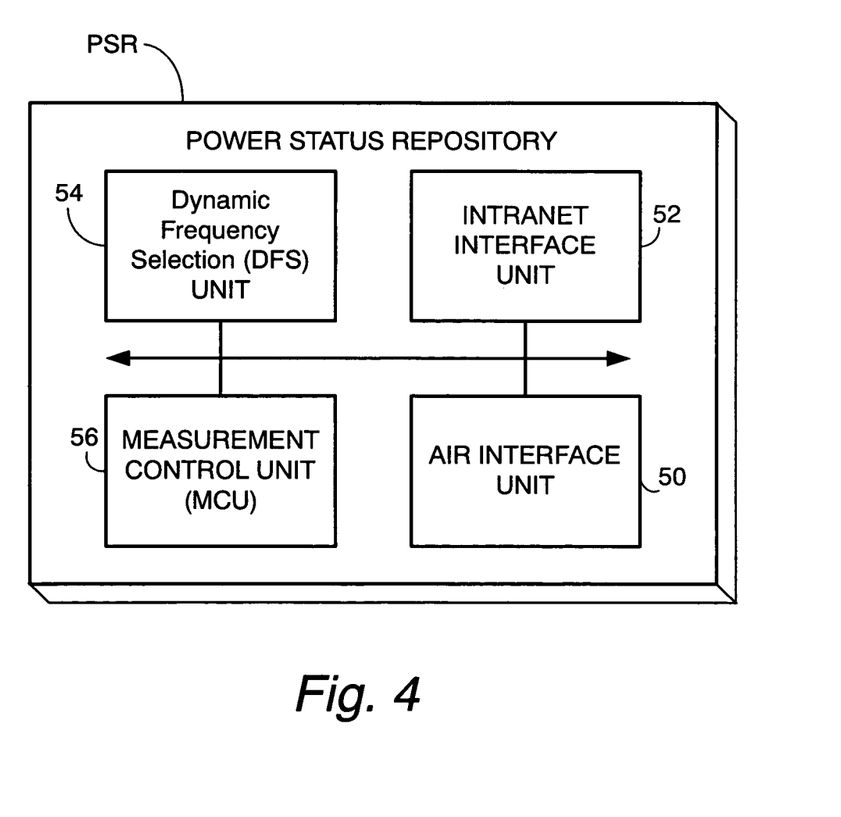
FIG. 4 is a schematic view of certain portions of a Power Status Repository (PSR) in accordance with the invention.

Basic components of an example Power Status Repository (PSR) relevant to the present invention are illustrated in FIG. 4. The Power Status Repository (PSR) of FIG. 4 includes an air interface unit 50 for performing the radio frequency communications with mobile terminal (MT) 30. In addition, Access Point (AP) 22 includes a unit 54 for executing the Dynamic Frequency Selection (DFS), and a measurement control unit (MCU) 56 which performs functions including some of the functions below described with reference to FIG. 5. It should be understood that the functions of Dynamic Frequency Selection (DFS) unit 54 and destination/source address field 56 can be performed by one or more processors (e.g., the same processor, if desired). Further, in the case of the Power Status Repository (PSR) being an Access Point (AP), the Power Status Repository (PSR) further includes an intranet interface unit 52 for communicating with intranet 24.

Figure 5:
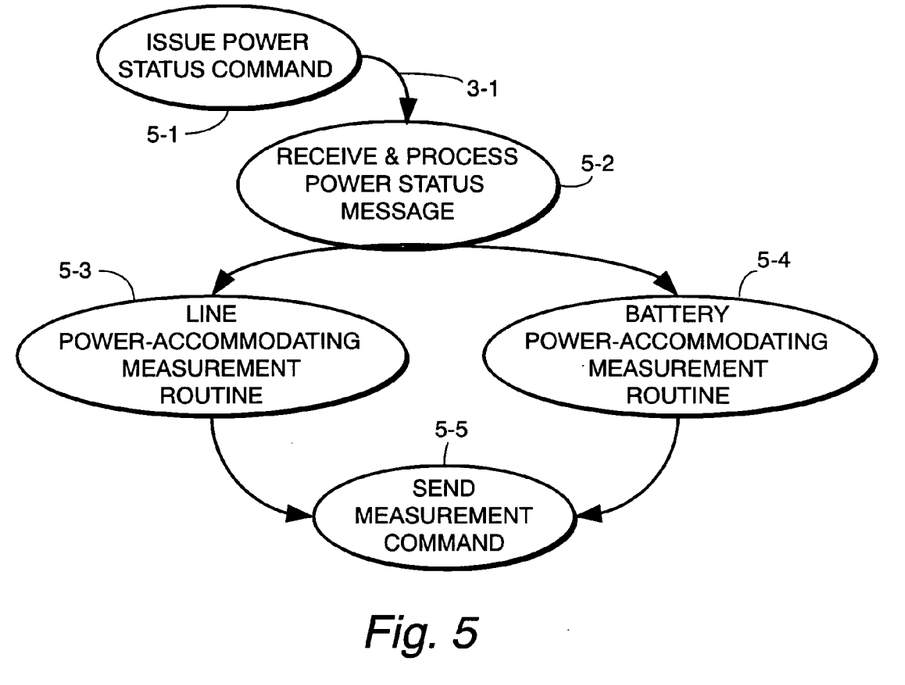
FIG. 5 is diagrammatic view of various basic operations performed by a Power Status Repository (PSR) in accordance with a mode of the invention.

FIG. 5 shows various basic operations performed by the Power Status Repository (PSR) pertinent to the frequency measurement control, e.g., measurement timing, of the present invention. Operation 5-1 shows Power Status Repository (PSR), and particularly measurement control unit (MCU) 56 thereof, issuing a power status request to mobile terminal (MT) 30, such as the power status request command 3-0 shown in FIG. 3. Upon receipt of the responsive power status information (e.g., power status message 3-1), the measurement control unit (MCU) 56 processes and decodes the power status message 3-1 as indicated by operation 5-2. Importantly, measurement control unit (MCU) 56 ascertains from the power status message 3-1 whether the mobile terminal (MT) 30 is currently utilizing battery power or line power. If power status message 3-1 indicates that battery power is currently being utilized, measurement control unit (MCU) 56 performs a battery power-accommodating measurement routine 5-4. On the other hand, if power status message 3-1 indicates that line power is currently being utilized, measurement control unit (MCU) 56 performs a line power-accommodating measurement routine 5-3. In accordance with timing determined by whichever of the routine 5-3 and 5-4 is performed, as depicted by operation 5-5 the measurement control unit (MCU) 56 sends a measurement command to mobile terminal (MT) 30, such as measurement command 3-2 as shown in FIG. 3.

The line power-accommodating measurement routine 5-3 and battery power-accommodating measurement routine 5-4 can differ in various respects, including the frequency (timing) at which measurement control unit (MCU) 56 requests that the mobile terminal (MT) 30 make frequency measurements. For example, the measurement control unit (MCU) 56 may choose to issue a measurement command 3-2 more often to a mobile terminal (MT) which is currently using line power than to a mobile terminal (MT) which is currently using battery power, since the line powered mobile terminal (MT) does not necessarily have any battery lifetime concerns at the moment.

Thus, with the power status information acquired from the mobile terminal (MT), the measurement control unit (MCU) 56 of the Power Status Repository (PSR) can ascertain whether the mobile terminal (MT) is connected to a wall socket to draw line power, or whether the mobile terminal (MT) is using a battery, and based on that information determine how often the Power Status Repository (PSR) will request that the mobile terminal (MT) perform its required measurements.

After the measurements are performed by the mobile terminal (MT) 30, the measurement results are reported by mobile terminal (MT) 30 to Power Status Repository (PSR) in messages not illustrated herein. The Access Point (AP) also performs its own frequency measurements. Using the measurements performed by the Power Status Repository (PSR), as well as the measurements performed and reported by the mobile terminal (MT) 30, the Dynamic Frequency Selection (DFS) unit 54 of the Power Status Repository (PSR) makes its best frequency determination for the connection.

Figure 6:
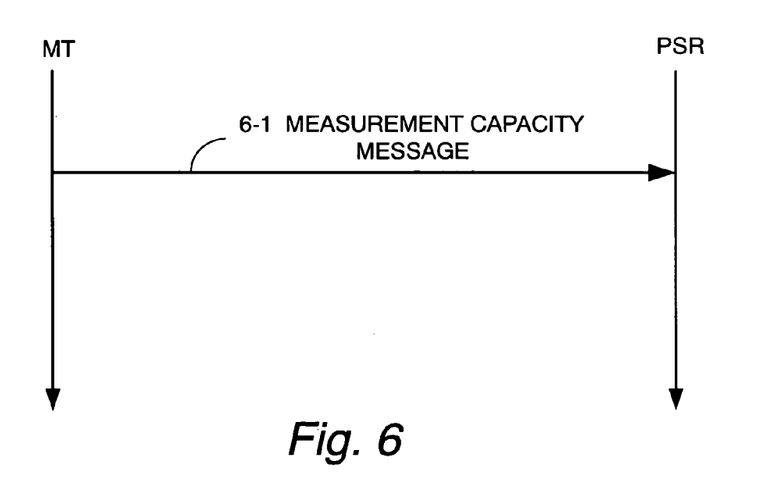
FIG. 6 is a schematic view depicting a measurement capability message transmitted from a mobile terminal (MT) to a Power Status Repository (PSR) in accordance with the present invention.

As another aspect of the invention illustrated in FIG. 6, the mobile terminal (MT) 30 can also send a measurement capability information to the Power Status Repository (PSR) 22 using, e.g., measurement capability message 6-1. As with the power status message, the measurement capability message 6-1 can be a MAC specific signal, a proprietary signal, or embedded in a message with other parameters. Moreover, the measurement capability information can be sent to Power Status Repository (PSR) 22 as a dedicated message (in like manner as power status message 3-1A of FIG. 8A), or in a message with other parameters (in like manner as message 3-1B of FIG. 8B). For example, the measurement capability information can be concatenated with other parameters in, e.g., a 54 byte LCH PDU or 9 byte PDU.

Using information carried in the measurement capability message 6-1, the measurement control unit (MCU) 56 can determine when the mobile terminal (MT) is not available to make measurements, and thereby avoid sending measurement commands to the mobile terminal (MT) 30, and/or increase the measurement taken from other mobile terminals (MTs) [as described below].

Example situations in which the measurement capability message 6-1 may be sent from the mobile terminal (MT) 30 to the Power Status Repository (PSR) 22 are those in which the mobile terminal (MT) 30 has low power or other restrictions on available power, such that the mobile terminal (MT) 30 determines that it should not tax its available power with frequency measurement operations, or to avoid the transmission of measurement requests that will be deleted. In this regard, in order for a sleeping mobile to act upon a message, the sleeping mobile must first be awaken. For a mobile to wake up and find a measurement request that cannot be fulfilled is both unnecessary and draining for the battery.

As another example, the measurement capability message 6-1 can include the sleep mode state (e.g., Dx state) of its Network Interface Card (NIC) 32, thereby apprising the Power Status Repository (PSR) 22 of the sleep mode state Dx.

Figure 7:
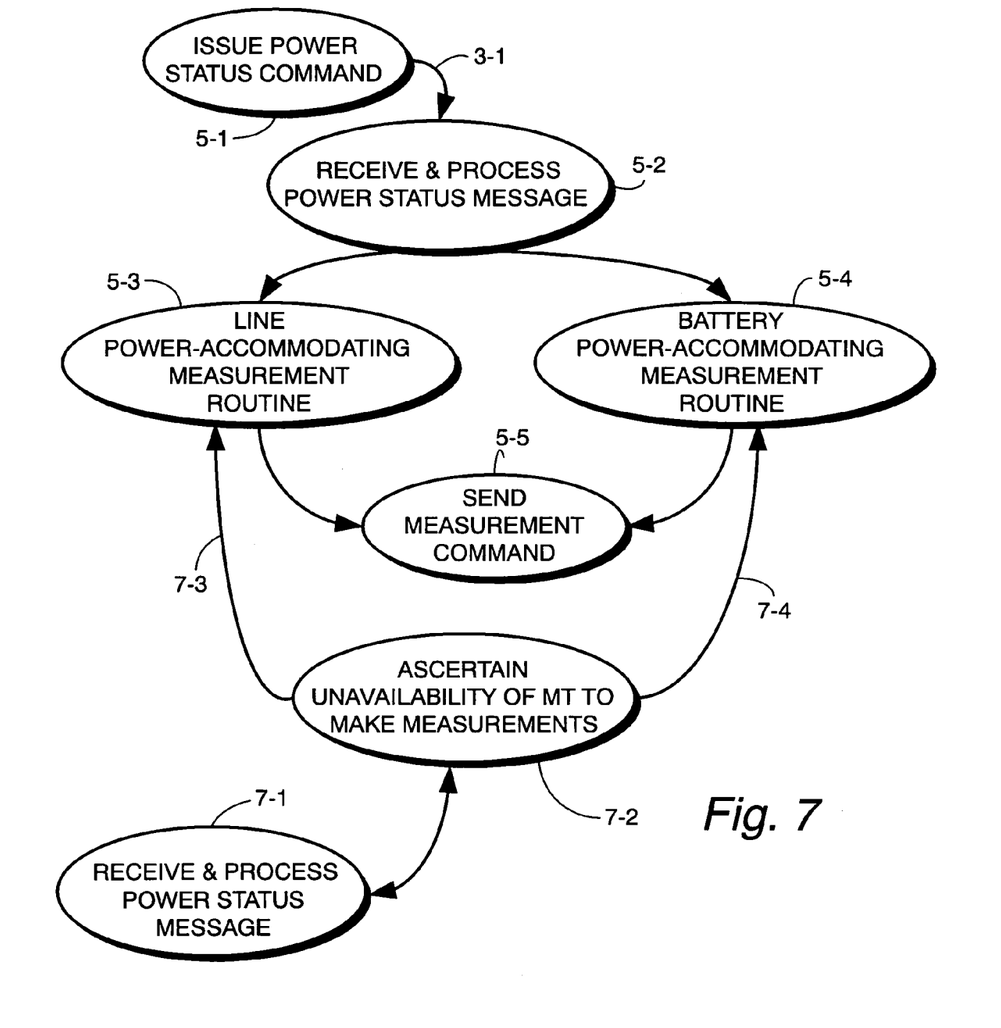
FIG. 7 is diagrammatic view of various other basic operations performed by a Power Status Repository (PSR) in accordance with another mode of the invention.

FIG. 7 shows how a measurement control unit (MCU) 56 performing the functions of FIG. 5 can additionally process the measurement capability message 6-1. Operation 7-1 of FIG. 7 shows reception and processing of the measurement capability message 6-1. As operation 7-2, the measurement control unit (MCU) 56 ascertains from the measurement capability message 6-1 that the mobile terminal (MT) 30 is not available to make measurements, and (as indicated by arrows 7-4 and 7-3, respectively) apprises its battery power-accommodating measurement routine 5-4 and line power accommodating measurement routine 5-3. In accordance, the routines 5-3 and 5-4 alter or suppress the timing of the measurement command(s) 3-2 which would be issued at operation 5-5.

A problem can arise if the Power Status Repository (PSR) has a notable decrease of measurement samples from the mobile terminals (MTs) served by the Power Status Repository (PSR). If enough mobile terminals (MTs) send measurement capability information to the Power Status Repository (PSR) which results in those mobile terminals (MTs) dropping out of measurement activity, the Dynamic Frequency Selection (DFS) algorithm of unit 54 may have an insufficient number of samples upon which to base its frequency determinations. If the Dynamic Frequency Selection (DFS) unit 54 does not get enough information concerning frequency measurements, there is a risk of interference and decreased performance in the current cell (e.g., the cell served by the Access Point (AP) 22) as well as in other cells in the vicinity. For example, another Access Point (AP) in the vicinity, e.g., Access Point (AP) $22_2$ in FIG. 1, may change frequency with the interference from that other Access Point (AP) increasing PDU error rate for Access Point (AP) $22_1$.

Figure 10:
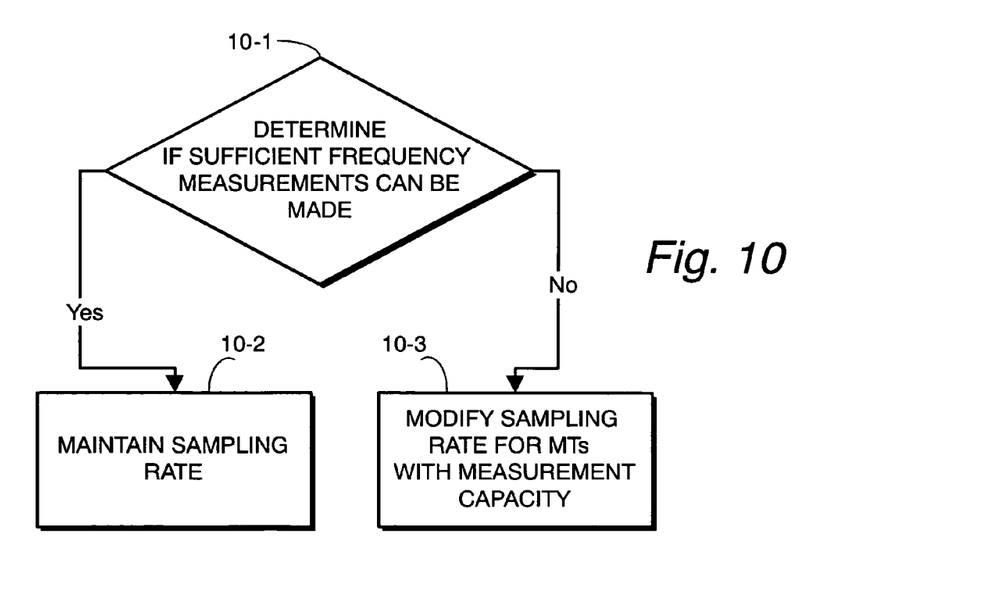
FIG. 10 is a flowchart showing basic steps of an aspect of the invention in which a Power Status Repository (PSR) in the form of an Access Point determines adequacy of a sampling rate in view of incapacitated mobile terminals.

Thus, as yet another aspect of the present invention, for frequency measurement purposes the Power Status Repository (PSR) can compensate for power incapacitated mobile terminals (MTs) by requesting more samples from the remaining mobile terminals (MTs) in the cell that have capacity for performing the measurements. FIG. 10 shows basic steps of an operation performed by the Dynamic Frequency Selection (DFS) unit 54 of the Power Status Repository (PSR) for ascertaining whether the sampling rate needs to be modified (e.g., increased) in view of incapacitated mobile terminals (MTs) in its cell. Step 10-1 shows the Dynamic Frequency Selection (DFS) unit 54 determining whether it has sufficient frequency measurement information, e.g., whether sufficient frequency measurements can be made in view, e.g., of the number of measurement-participating mobile terminals (MTs) in the cell. If the determination of step 10-1 is affirmative, the status quo for sampling rate is preferably maintained as indicated by step 10-2. However, if the determination of step 10-1 is negative, at step 10-3 the Dynamic Frequency Selection (DFS) unit 54 modifies (e.g., increases) the sampling rate for mobile terminals (MTs) in its cell which have the capacity to measure frequency. As an example scenario, if too many mobile terminals (MTs) served by a Power Status Repository (PSR) happen to report measurement capacity information exempting or precluding them from making frequency measurements (as determined at step 10-1), at step 10-3 the Dynamic Frequency Selection (DFS) unit 54 sends measurement request commands (measurement command 6-2 of FIG. 6) to the remaining mobile terminals (MTs) at a greater timing frequency, thereby compensating to some degree for the loss of information attributable to the incapacitated (e.g., power incapacitated mobile terminals (MTs))

Figure 9:
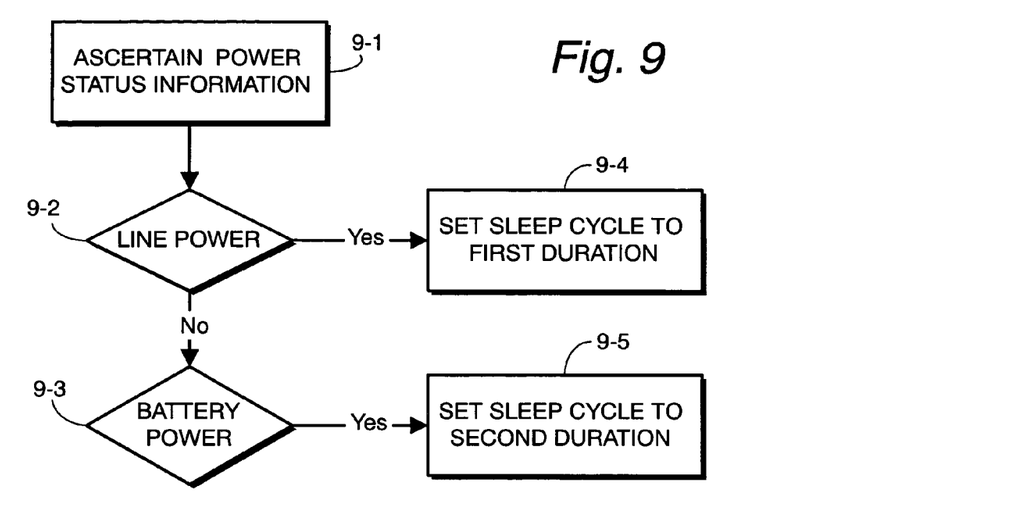
FIG. 9 is a flowchart showing basic steps of an aspect of the invention wherein a mobile terminal uses its power status information to select sleep periodicity

As still another aspect of the present invention, the mobile terminal (MT) 30 itself can use its power status information to select sleep periodicity. For example, the mobile terminal (MT) 30 can select a shorter or longer sleep cycle in accordance with whether line power or battery power is being utilized (the minimum being avoidance of sleep altogether). In this regard, FIG. 9 shows example routine performed by mobile terminal (MT) 30 in which (as step 9-1) the power status information is obtained in conventional manner. The mobile terminal (MT) 30 makes a determination at step 9-2 whether line power is currently being utilized, and at step 9-3 whether battery power is currently being utilized. If line power is currently being utilized, mobile terminal (MT) 30 sets its sleep cycle to a first duration (time) value, as indicated by step 9-4. If, on the other hand, battery power is currently being utilized, mobile terminal (MT) 30 sets its sleep cycle to a second duration (time) value, as indicated by step 9-5. By using the power status information itself, the mobile terminal (MT) may choose a shorter sleep periodicity to achieve a shorter delay upon mobile terminated data.

Thus, with the power status information provided by the mobile terminal (MT) over the air interface to the Power Status Repository (PSR), the Power Status Repository (PSR) can, if needed, increase the incidence of measurements for the Dynamic Frequency Selection (DFS) algorithm for a mobile terminal (MT) using line power. The number of measurement samples performed by a mobile terminal (MT) operating on line power does not affect the battery operation of the mobile terminal (MT). On the other hand, when a mobile terminal (MT) is being operated on its battery, the incidence of measurements may be decreased for sake of battery conservation.

By using the measurement capability message, e.g., including the sleep mode state, or an indication of unavailability of the mobile terminal (MT) to make a measurement, the Power Status Repository (PSR) can compensate the measurement report loss by decreasing the periodicity of the measurement reporting for other mobiles and avoid sending measurement requests to the mobile terminal (MT) that reports inability to measure.

Whereas the ad hoc type of wireless local area network has been shown in FIG. 1B as having one of the participating mobile terminals (MTs) serve as the power status repository, the functions of the power status repository can be distributed or shared among plural mobile terminals. In such event, the power status information of the present invention is transmitted to the mobile terminals which share the power status repository functions. In some instances it is envisioned that all participating mobile terminals can receive the power status information, etc., of the present invention.

Figure 11:
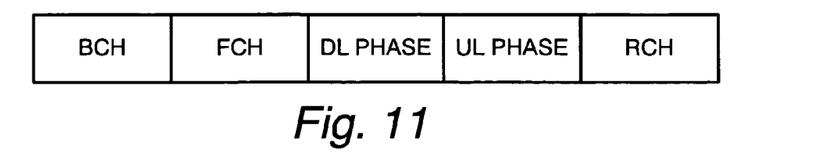
FIG. 11 is a diagrammatic view of a MAC frame structure useful for the present invention.

The person skilled in the art will appreciate that, in FIG. 11, the borders between various portions of the frame may be changed or vary due to traffic requirements. Such borders particularly include the DL phase/UL phase border and the UL phase/RCH border.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A wireless local area network (LAN) comprising a mobile terminal which communicates over an air interface with a power status repository, wherein the mobile terminal transmits measurement capability information over the air interface to the power status repository, the measurement capability information having an indication of whether the mobile terminal has a power capacity to perform radio frequency measurements, wherein if the power status repository does not have sufficient measurements regarding radio frequency, the power status repository modifies a rate at which a frequency measurement command is transmitted to another mobile terminal.

2. The network of claim 1, wherein the power status repository increases a rate at which a frequency measurement command is transmitted to another mobile terminal.

3. A method of operating a wireless local area network (LAN) comprising a mobile terminal which communicates over an air interface with a power status repository; the method comprising:

the mobile terminal transmitting measurement capability information over the air interface to the power status repository, the measurement capability information having an indication of whether the mobile terminal has a power capacity to perform radio frequency measurements;

the power status repository using the measurement capability information to determine whether to transmit a frequency measurement command to the mobile terminal to request the mobile terminal to make measurements regarding a radio frequency; and if the power status repository does not have sufficient measurments regarding radio frequency, the power status repository modifying a rate at which a frequency measurement command is transmitted to another mobile terminal.

4. The method of claim 3, wherein the power status repository increases a rate at which a frequency measurement command is transmitted to another mobile terminal.

5. A wireless local area network (LAN) comprising:

a power status repository;

plural mobile terminals which communicate over an air interface with the power status repository;

wherein if the power status repository does not have sufficient measurements from the plural mobile terminals in view of incapacity of one or more of the plural mobile terminals to perform a frequency measurement regarding radio frequency, the power status repository modifies a rate at which a frequency measurement command is transmitted to any of the mobile terminals which have sufficient capacity to perform the frequency measurement.

6. The network of claim 5, wherein the, power status repository increases a rate at which a frequency measurement command is transmitted to the mobile terminals which have sufficient capacity to perform the frequency measurement.

7. The network of claim 5, wherein the power status repository is an access point of the wireless local area network.

8. The network of claim 5, wherein the wireless local area network is an ad hoc network and wherein the power status repository is another mobile terminal participating in the network.

9. A method of operating a wireless local area network (LAN) having plural mobile terminals which communicate over an air interface with a power status repository, the method comprising:

making a determination whether the power status repository has sufficient measurements from the plural mobile terminals in view of incapacity of one or more of the plural mobile terminals to perform a frequency measurement regarding radio frequency; and if the determination is negative;

modifying a rate at which a frequency measurement command is transmitted from the power status repository to any of the mobile terminals which have sufficient capacity to perform the frequency measurement.

10. The method of claim 9, further comprising the power status repository increasing a rate at which a frequency measurement command is transmitted to the mobile terminals which have sufficient capacity to perform the frequency measurement if the determination is negative.

11. The method of claim 9, further comprising using an access point of the wireless local area network as the power status repository.

12. The method of claim 9, wherein the wireless local area network is an ad hoc network, and wherein the method further comprises using another mobile terminal participating in the network as the power status repository.

* * * * *

UNITED STATES PATENT AND TRADEMARK OFFICE
CERTIFICATE OF CORRECTION

| | |
|---|---|
| PATENT NO. | : 7,433,702 B2 |
| APPLICATION NO. | : 09/757084 |
| DATED | : October 7, 2008 |
| INVENTOR(S) | : Lindskog et al. |

It is certified that error appears in the above-identified patent and that said Letters Patent is hereby corrected as shown below:

In Column 9, Line 13, delete "Al" and insert -- AI --, therefor.

In Column 14, Lines 26-27, in Claim 3, delete "measurments" and insert -- measurements --, therefor.

Signed and Sealed this

Thirty-first Day of March, 2009

JOHN DOLL
*Acting Director of the United States Patent and Trademark Office*